Patented Mar. 26, 1940

2,195,362

UNITED STATES PATENT OFFICE 2,195,362

GLYCOL-MALEIC ACID RESIN AND PROCESS OF MAKING SAME

Carleton Ellis, Montclair, N. J., assignor to Ellis-Foster Company, a corporation of New Jersey No Drawing. Application May 21, 1936, Serial No. 81,028

5 Claims. (Cl. 260—75)

This invention relates to compositions comprising alkyd resins of the maleic polyester type and polymerization catalysts therefor, said compositions being capable of being converted to an insoluble-infusible condition without evolution of water vapor when conversion occurs in a mass, film or filament of the composition.

This is a continuation in part based on my copending application Serial No. 603,898, filed April 7, 1932, which describes polybasic acid-polyhydric alcohol resins containing inorganic acids and related bodies in amount sufficient to modify the reaction. The latter application is a continuation in part based on my application Serial No. 609,136, filed December 26, 1922, now U. S. Patent No. 1,897,977, which relates to compositions comprising a fusible soluble polyhydric alcohol-polybasic organic acid condensation product and a material capable of accelerating the conversion thereof into an infusible-insoluble form, the solidification under certain conditions being a rather sudden conversion from a molten liquid to a spongy solid through a reaction which is accompanied by the evolution of some gases and vapors.

It is an object of this invention to provide compositions in the form of masses, films, fibers or powders which rapidly harden under the influence of oxidation and/or polymerization catalysts or oxygen in contact therewith to form hard, tough bodies of generally water-resistant nature which can be utilized in various ways such as for castings, coatings, cemented or molded articles, binders for fibrous or powdered substances and the like.

This invention is concerned with a new and hitherto unrecognized type of oxygen-convertible alkyd resins comprising maleic polyesters. The term maleic polyester as used herein is intended to cover the polyhydric alcohol esters of maleic acid and other acids equivalent to maleic in the respect of forming polymerized esters of the infusible-insoluble type. Besides maleic acid or anhydride there are included other polybasic acids such as fumaric, itaconic, citraconic and the like or mixtures of these; also acids which yield such compounds during reaction, such as citric and malic. By speaking of the present products as being oxygen-convertible, it is not intended that the entire hardening process is by oxidation. Hardening is induced by oxygen and active oxygen compounds but the main hardening reaction is believed to be polymerization. In this respect the term oxygen-convertible comes within the purview of the term polymerization-convertible. The term "maleic type ester" is used herein to cover esters of the acids typified above.

Reviewing the various classes of alkyd resins, it may be stated that polyesters obtained from polyhydric alcohols containing two or more hydroxyl groups and polybasic acids containing three or more carboxyl groups, or from polyhydric alcohols of three or more hydroxyls and polybasic acids of two or more carboxyls, are resins of the so-called heat-convertible type. That is, such polyesters on heating become insoluble and infusible as a result of continued esterification. It is also generally assumed that polyesters made from dihydric alcohols and dibasic acids are non-convertible and do not reach an insoluble and infusible condition on continued heating. Although esters such as glycol fumarate and glycol maleate have been known for a long time to be heat-convertible and therefore to be exceptions to the generalization that all dihydric alcohol-dibasic acid condensation products are non-convertible, it has not been recognized that such polyesters are also oxygen-convertible, drying oil alkyd resins having heretofore been the sole representatives of oxygen-convertible alkyd resins. Hardening of maleic polyesters by heat alone is greatly accelerated through the cooperation of an agent which supplies an element for hardening (oxygen or a supplier of oxygen, or other hardening agent). Furthermore, as with drying oil alkyd resins, heat is not necessary for hardening provided the right conditions are chosen (e. g., addition of a hardening catalyst and exposure to ultraviolet light).

The distinction between hardened resins of the maleic type and other hardened alkyd resins (e. g., phthalic resins) is that (1) in their formation the latter type result from esterification reactions entirely, whereas maleic resins are the result of both esterification and polymerization, and (2) phthalic resins on saponification give phthalic acid (the original acid used in making the resin) but maleic resins yield a mixture of acids containing some polymeric acids and not entirely the original simple acid used.

Polymerization of maleic polyesters is accelerated by catalysts and if no catalyst is present (for example, if the reaction is carried out in an inert atmosphere) hardening ordinarily progresses relatively slowly. In the formation of maleic resins in the soluble-fusible form the main reaction is esterification if no polymerization catalyst is present, and the esterification can be carried as far as feasible to obtain fusible, soluble esters of low acid number. If at this stage a catalyst is introduced, further heating (preferably at a lower temperature) results in the formation of an insoluble infusible resin. Water vapor is given off continuously during the hardening of other types of alkyd resins such as glycerol phthalate and results in vesiculated masses unless special heating procedures are followed. In the present case, however, I may conduct the esterification at a relatively high temperature so as to reach an advanced stage of esterification and thus eliminate as much as possible of the water vapor formed in making the uncured resin. If a catalyst is then incorporated and heating is continued but at a temperature somewhat lower than used in the esterification the succeeding hardening occurs without evolution of water vapor and bodies free from bubbles result. That is, it is possible to carry the esterification to a point where water is eliminated in advance of any curing treatment.

Therefore, the preferred method of utilizing the products of the present invention is to esterify the mixture of maleic acid and polyhydric alcohol to the highest degree consistent with good solubility and fusibility and thus eliminate a maximum amount of the water of reaction. To a solution or melt of the resin in this stage a polymerization catalyst is added and the resin is hardened at a temperature lower than that necessary for esterification to proceed but high enough for polymerization to occur at a controlled rate. Addition of a polymerization catalyst to a solution of the first stage (soluble-fusible) resin forms a lacquer which may be hardened (in thick layers, if desired), by stoving or otherwise. Addition of a catalyst to the fused first-stage resin affords a composition which can be poured into molds and rapidly hardened in an oven at a moderate temperature.

If desired the esterification reaction may be conducted in the presence of a polymerization anticatalyst such as hydroquinone and carried to the requisite degree. The anticatalyst is then removed or destroyed and a polymerization catalyst added, resulting in a composition that may be cured by polymerization.

The products of this invention comprise soluble-fusible resinous complexes of the maleic polyester type and insoluble-infusible bodies obtained therefrom. The soluble-fusible intermediates are in such form that they can be readily and controllably converted to the insoluble-infusible form and preferably contain incorporated therewith a polymerization catalyst such as a peroxide (benzoyl, acetyl-benzoyl, cyclohexanol, hydrogen, calcium, or barium peroxides), an ozonide (diisobutylene, terpenes, etc.), or mixtures of these. Uranium and like salts act as promoters for the action of ultraviolet light and when incorporated in the resin and exposed to light result in hardening.

When the resinous composition presents a substantial surface to contact with air, metallic compounds such as are used in drying oil varnishes act as hardening agents or polymerization inducing catalysts through their capacity of behaving as oxygen carriers. Such metallic drier combinations are therefore considered to fall within the scope of this invention.

Oxidation products such as are formed by exposing the resins to air (as by heating the resin in contact with air or by limited blowing with air at an elevated temperature) also function as polymerization catalysts.

Catalysts of more anomalous character include active halides such as boron fluoride, aluminum chloride, sulphur chloride and the like.

The following will serve as examples to illustrate the element-convertible resins of this invention and the manner in which they are prepared, but it is to be understood that these examples are set forth merely for illustrative purposes and that various modifications may be made which will depart in one way or another from the specific course provided by the examples and that such modifications are considered to be within the confines of the present invention.

EXAMPLE 1.—*Glycol maleate*

Maleic anhydride (98 parts, 1 mol) and ethylene glycol (68 parts, 1 mole plus 10% excess) were heated in an inert atmosphere for 2 hours at 200° C. to yield a pale amber-colored resinous mass which was readily soluble in acetone and glycol monoalkyl ethers, slightly soluble in butanol and insoluble in butyl acetate. On baking a film of the resin at 100° C. it slowly became non-tacky. Addition of driers of the type used with drying oils (e. g., lead, cobalt and manganese linoleates, resinates or naphthenates) resulted in an acceleration of the hardening, smooth, hard films being obtained. By carrying out the esterification reaction for a longer period at 200° C. (11 hours) a faster-drying resin is formed.

Maleic acid and ethylene glycol can be esterified without the use of an inert gas but in this case the product is much darker in color. For example, maleic acid (116 parts) and ethylene glycol (124 parts) were heated at 150° C. for 20 hours. Films of this resin with drier added hardened to a clear light-yellow coating. Blowing the resin with air for 10 minutes at 150° C. resulted in a dark-colored product which, however, was still soluble in acetone. Films of the resin could be dried by exposure to sunlight in a relatively short time, that is, in a much shorter time than by heating at the same temperature but in the absence of light.

EXAMPLE 2.—*Glycol succinate*

For comparison with the resin of Example 1, a resin made as follows may be considered. Succinic acid (118 parts) and ethylene glycol (68 parts) were heated for 2 hours in an inert atmosphere at 200° C. to yield a pale-colored resinous mass. A film of the resin on baking at 100° C. failed to dry and remained tacky. Addition of polymerization catalysts also did not cause drying.

EXAMPLE 3.—*Diethylene glycol maleate*

Maleic anhydride (147 parts) and diethylene glycol (130 parts) were heated in an inert atmosphere at 200° C. for 2 hours. The resulting resin was light colored and somewhat less viscous than the ethylene glycol product made under the same conditions. Films of the diethylene glycol maleate containing metallic driers, when baked at 100° C., yielded coatings which were somewhat wrinkled, an effect which is suggestive of certain drying oil compositions.

The resin prepared by using the same proportion of ingredients but which was heated for 10 instead of 2 hours at 200° C. was a light yellow, viscous mass which dried much faster than when the esterification was not carried so far. When metallic driers were added, a hard colorless film was obtained by baking. The resin could also be made to harden at ordinary temperatures in sunlight.

Addition of benzoyl peroxide to diethylene glycol maleate which had been warmed to 100° C. caused very rapid gelling, indicating the catalytic action of the peroxide. Cyclohexanol peroxide was not as effective in gelling the resin as benzoyl peroxide. Gelation of diethylene glycol maleate also took place when benzoyl peroxide was added to a dioxan solution of the resin and heated under a reflux condenser.

EXAMPLE 4.—*Triethylene glycol maleate*

Maleic anhydride (158 parts) and triethylene glycol (264 parts) were heated in an inert atmosphere for 2½ hours at 200° C. to yield a light-colored mass of acid number 44, which was less viscous than diethylene glycol maleate. Dissolved in acetone and with driers added (in amounts such as are used with drying oils), a coating composition was obtained which gave baked films exhibiting a pronounced wrinkled surface. Triethylene glycol shows a more definite effect of oxidation than the lower glycols.

When a film of the triethylene glycol maleate was exposed to an atmosphere containing boron fluoride a wrinkled surface was also obtained. When boron fluoride is passed into the fused resin, or when stannic chloride, aluminum chloride, zinc chloride or sulphur chloride is added, thickening of the mass results.

Blowing the resin with air for 10 minutes changed the color to a pale rose and at the same time increased the viscosity of the mass.

EXAMPLE 5.—*Triethylene glycol maleate-cinnamate*

Triethylene glycol (210 parts), maleic anhydride (126 parts) and cinnamic acid (10 parts) were heated in an inert atmosphere for 11 hours at 200° C. A solution of the resin applied to a surface and baked yielded a hard, tough film and when driers were present the film was wrinkled. No discernible difference was noted in the rate of drying caused by the presence of cinnamic acid but the baked films were much lighter in color than in the case of the straight maleic ester.

Benzoyl peroxide was mixed with the resin in the proportion of 1 part of peroxide to 30 parts of resin and the mixture heated at 100° C. for 1½ hours. During this time the resin gelled to a light-colored flexible mass.

EXAMPLE 6.—*Glycol citrate*

Citric acid monohydrate (250 parts) was heated under an air reflux condenser to 250° C. At above 150° C. the melt became yellow and eventually orange. On cooling, an orange, hygroscopic resinous mass was obtained (161.5 parts). To this product ethylene glycol (118 parts) was added and the mixture heated in an inert atmosphere for 1½ hours, the temperature reaching 190° C. A light orange-colored resin resulted, baked films from an acetone solution of which were clear, hard, light yellow and water-resistant.

EXAMPLE 7.—A resin from citric acid and diethylene glycol was also made without pretreatment of the acid. Citric acid (120 parts) and diethylene glycol (68 parts) were heated at 180° C. The polyester showed a pronounced tendency to gel. The reaction was stopped before the gel stage was reached (which required less than ½ hour). The resin was colorless but insoluble in acetone.

EXAMPLE 8.—*Diethylene glycol-glycerol maleate*

Diethylene glycol (26 parts, ¼ mol), glycerol (46 parts, ½ mol) and maleic acid (116 parts, 1 mol) were heated at 200° C. for 15 minutes and allowed to cool to about 135° C. About 5% of benzoyl peroxide was stirred into the fused ester and the temperature was raised to about 185° C. to remove air bubbles which were formed incident to mixing in the catalyst. The fused mass was poured into metal molds (lined with amalgamated tin) and cured by heating in an oven at 100° C. for 36 hours. The final product was light in color and extremely hard and tough. It was unaffected by water and insoluble in all available organic solvents. When heated it softened very slightly. An intermediate product was obtained after some 20 hours of baking which was light colored, soft and rubbery.

EXAMPLE 9.—Glycerol (297 parts), diethylene glycol (171 parts) and maleic acid (696 parts) were heated to 200° C. and stirred vigorously for about 6 minutes. The temperature was then allowed to fall to 100° C. and benzoyl peroxide (7 parts) was added. The mixture was maintained at 150° C. for 3 hours and the mass was then poured through a coarse wire screen (to remove gelled particles) into a mold where it was allowed to harden for 7 days at 100° C. A clear, hard, light-colored mass resulted.

The use of glycols and polyglycols is stressed in the above examples because with glycols the distinction is more clearly shown between maleic polyesters and the other types of alkyd resins. Any other resinifying polyhydric alcohol can be used along with glycols, or higher polyhydric alcohols (glycerol, polyglycerols, pentaerythritol, mannitol, sorbitol, etc.), can be used alone, the main provision being that adequate esterification to yield a soluble and fusible product is attained prior to polymerization. Small amounts of monohydric alcohols may be utilized with polyhydric alcohols and serve to impart a certain amount of plasticity to the hardened mass. It may be noted that monohydric alcohols alone with polybasic acids of the maleic type yield simple esters which when polymerized are permanently soluble and fusible.

Another aspect of this invention is the polymerization of maleic polyesters in the presence of other miscible polymerizable bodies. For example, a maleic polyester mixed with vinyl acetate to which a polymerization catalyst is added is converted into a homogeneous copolymer of vinyl acetate and maleic polyester. When vinyl acetate is added to a solution of diethylene glycol maleate and benzoyl peroxide in dioxan and heated under a reflux condenser, a gel is quickly precipitated from the solution. Maleic polyesters polymerize more quickly in the presence of vinyl acetate than alone and only a small amount of vinyl acetate is necessary (for example, about 4%) in order to accelerate the reaction. Other polymerizable compounds can also be treated in conjunction with maleic polyesters; for example, vinyl chloride, styrene, acrylic acid, acrylic esters, methacrylic esters, cinnamic and crotonic esters, vinylacetylene, ethers and esters of vinyl alcohol, conjugated diolefins and the like or mixtures of these. Products of different nature are obtained by copolymerizing a mixture of a maleic polyester and a polymerizable acid than when the maleic resin is modified with a polymerizable acid and the mixed ester subsequently polymerized. For example, a copolymerized mixture of acrylic acid and maleic polyester has a higher acid number than a mixed acrylic-maleic polyester.

Any of the maleic polyesters can be modified with non-polymerizing acids by replacing part of the maleic. Any type of acid reactive with the other constituents of the mixture to form a homogeneous mass can be used. Furthermore, a considerable amount of the unsaturated polybasic acid may be replaced without unduly sacrificing the polymerizing property of the resin, provided the reactants have been esterified to a degree representing the formation of a resin molecule of high molecular weight. Such available polybasic acids can be used as phthalic, succinic, tartaric, oxalic, adipic, sebacic and the maleic adducts of compounds containing conjugated double bonds; and monobasic acids such as natural resin acids, benzoic, cinnamic, salicylic, lactic and the fatty acids obtainable from vegetable oils by saponification.

The intermediate products of this invention are compatible with nitrocellulose in mutual solvents and form lacquers the films of which become insoluble when the resin has been hardened. Oxidized drying oils in lacquer films cause lifting when a subsequent coat is applied on account of the swelling of linoxyn by nitrocellulose solvents. Hardened maleic resins, on the other hand, are not affected in this way by lacquer solvents and lacquer coatings containing the hardened resins can be recoated without the solvents in the later coats unduly softening the first coats. Nitrocellulose lacquers containing maleic resins and driers can also be utilized to form wrinkled coatings. Unmodified maleic resins in the soluble form are compatible with cellulose acetate and cellulose ethers, as well as with nitrocellulose.

Adhesion of hardened maleic polyesters to most surfaces is very pronounced. Coatings adhere to metals very tenaciously, which suggests their use as primers or coatings for sheet metal. Adhesion is only slight to amalyamated tin or greasy surfaces. Products in the soluble-fusible form can also be used as cements and subsequently hardened. For example, pieces of earthenware and the like can be joined, or glass plates can be stuck together to form safety glass, the resins being used alone or mixed with compatible cellulose derivatives, or as a cement to join cellulose ester sheets to glass. Cured sheets of the resin can be used as a glass substitute.

Masses of resin can be cured in the final shape desired or they may be machined or otherwise worked to form various articles. The uncured resin may be mixed with dyes, pigments, plasticizers or fillers and subsequently hardened. Mixed with a pigment and extending agent (e. g., a cellulose or mineral filler), a composition is obtained which can be sheeted and cured in layers. When a white pigment is used floor tiles of permanent color can be obtained.

What I claim is:

1. The method of producing an insoluble-infusible resinous composition which consists in reacting a mixture consisting of an acid from the group consisting of maleic, fumaric, itaconic and citraconic with a glycol, heating the reacting mixture to an advanced stage of esterification at which substantially no further water can be eliminated, incorporating with said esterified product a polymerizing catalyst, and subjecting the resultant mixture to polymerizing conditions in the presence of air.

2. The method of producing an insoluble-infusible resinous composition which consists in reacting a mixture consisting of maleic acid and a glycol, heating the reacting mixture to an advanced stage of esterification at which substantially no further water can be eliminated, incorporating with the said esterified product a polymerizing catalyst, and subjecting the resultant mixture to polymerizing conditions in the presence of air.

3. The method of producing an insoluble-infusible resinous composition which consists in reacting a mixture consisting of maleic acid and a glycol, heating the reacting mixture to an advanced stage of esterification at which substantially no further water can be eliminated, incorporating with the said esterified product a polymerizing catalyst, and heating the mixture to polymerize the same.

4. A soluble resinous material capable of being converted to the infusible, insoluble state consisting of the reaction product obtained by reacting a mixture consisting of an acid from the group consisting of maleic, fumaric, itaconic and citraconic acids with a glycol, and heating the reacting mixture to an advanced stage of esterification at which substantially no further water can be eliminated, the said esterified product being admixed with a polymerizing catalyst.

5. A soluble resinous material capable of being converted to the infusible, insoluble state consisting of the reaction product obtained by reacting a mixture consisting of maleic acid with a glycol, and heating the reacting mixture to an advanced stage of esterification at which substantially no further water can be eliminated, the said esterified product being admixed with a polymerizing catalyst.

CARLETON ELLIS.